June 7, 1932.     J. D. LOWRY     1,861,929

CONTROL APPARATUS

Filed Jan. 14, 1930

INVENTOR

John D. Lowry,

BY

ATTORNEYS

Patented June 7, 1932

1,861,929

UNITED STATES PATENT OFFICE

JOHN D. LOWRY, OF DETROIT, MICHIGAN, ASSIGNOR OF ONE-HALF TO NORMAN H. BERRY, OF DETROIT, MICHIGAN

CONTROL APPARATUS

Application filed January 14, 1930. Serial No. 420,805.

The present invention pertains to a novel control apparatus for governing a certain condition, for example the temperature, in a system.

Various devices for this general purpose are well known in the art but are objectionable in many instances because of their high initial cost and high cost of maintenance. This leads to the use of inferior instruments or neglect in maintenance, with the result that the maximum degree of the condition to be controlled is often allowed to be exceeded, resulting in damage to apparatus and materials.

The principal object of the present invention is to provide a simpler and hence less expensive control apparatus which however will be accurate and reliable. A departure from the prior devices is made in mounting the relatively movable plates of a small variable condenser on the relatively movable parts of a sensitive instrument responsive to the condition to be controlled. The relatively movable parts of the instrument are positioned to bring the condenser to its maximum capacity on the attainment of the maximum permissible degree of the condition to be governed. This maximum capacity is utilized, through a grid-glow tube, to close a relay circuit which in turn governs the supply of energy creating the condition under control.

The invention is fully disclosed by way of example in the following description and in the accompanying drawing, in which—

Reference to these views will now be made by use of like characters which are employed to designate corresponding parts throughout.

For the purposes of illustration, the apparatus will be described in connection with an electric furnace 1 heated by an electric element 2. In the furnace is inserted a thermocouple 3 which is responsive to temperature changes and which translates these changes in terms of readings on an instrument.

Figure 1:
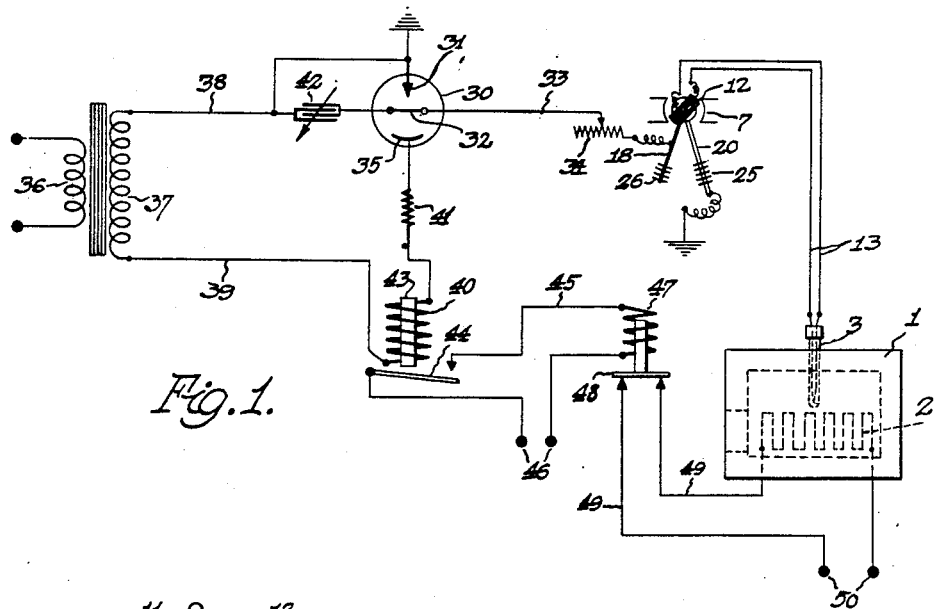
Figure 1 is a wiring diagram of the apparatus.
Figure 2:
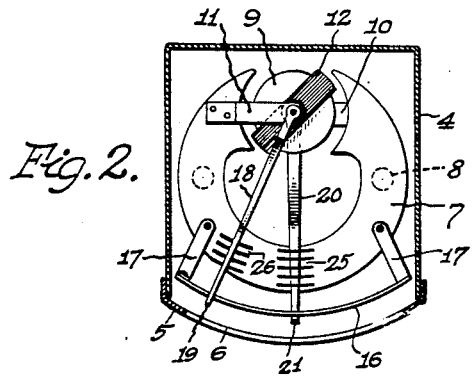
Fig. 2 is a plan section of the indicating instrument.
Figure 3:
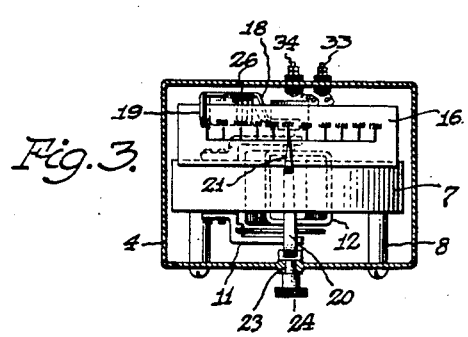
Fig. 3 is a front elevation of the instrument, showing the housing in section.
Figure 4:
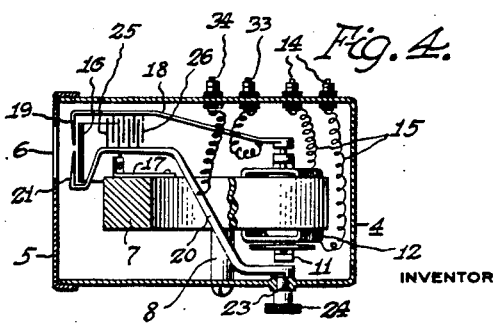
Fig. 4 is a vertical section of the instrument at right angles to Figure 3 and partly in elevation.

The instrument is of the moving coil type and is illustrated in detail in Figures 2, 3 and 4. It is built within a suitable housing 4 having a separable front plate 5 with a sight opening 6. Within the housing is supported a curved permanent field member 7 on studs 8, and between the ends of this member is a fixed core 9 also constituting a part of the field and supported from the member 7 by one or more brackets 10 extending from one end of this member. From the other end of the member 7 are extended a pair of brackets 11 having their free ends located above and below the core 9. The free ends of the brackets 11 pivotally support a moving coil or winding 12 which loosely encloses the core 9. Conductors 13 extend from the terminals of the thermo-couple 3 to binding posts 14 on the housing 4, the binding posts being in turn connected to the ends of the winding 12 by conductors 15. Along the sight opening 6 is a scale 16 supported within the housing 4 by brackets 17 extending from the permanent field member 7 or from any other fixed member.

To the movable winding 12, preferably at the central point of the upper surface thereof, is attached one end of an indicating arm 18, the other end 19 of which is pointed and suitably bent to cooperate with the graduations on the scale 16. To the base of the housing 4 is attached one end of a relatively fixed arm 20 which also has its free end 21 pointed and suitably bent to cooperate with the scale 16. The fixed arm has a frictional pivotal attachment 23 to the housing, so that it may be turned by means of a knob 24 to bring the end 21 to any desired position on the scale 16, after which the arm remains stationary. The arm is set at the critical point on the scale at which the control system is intended to function, as will presently appear below.

The fixed arm 20 carries a set of small and light condenser plates 25 which, if of any considerable length, have a center of curvature at the pivot point of the arm 18. The latter carries another set of condenser plates 26 adapted to alternate or mesh with the plates 25 and preferably of smaller area than the plates 25 or comparable in size to household pins. These plates are of very light weight in order not to interfere with the movement of the arm 18 and in practice may be considerably shorter than shown in Figure 2.

It will now be apparent that the moving coil instrument has been converted into a condenser which has its maximum capacity when the arm 18 reaches the setting of the arm 20 with respect to the scale 16. The apparatus is completed by means, depending on the maximum capacity of the condenser, for controlling the supply of energy to the apparatus 1 containing the sensitive responsive element 3.

In the specific construction illustrated herein, the condition to be controlled is a temperature condition produced by an electric current which is to be arrested when a predetermined maximum temperature is indicated by the moving coil instrument. The circuit containing the electrical heating element is made and broken through the operation of a cascade relay system, the weakest relay of which is in turn controlled by another circuit maker and breaker responsive to the maximum capacity in the condenser constituted by the plates 25 and 26.

A suitable condenser-operated circuit maker and breaker has been found in the grid-glow tube such as that described by J. V. Breisky and E. O. Erickson at the Regional Meeting of the Southern District of the A. I. E. E., Atlanta, Georgia, October 29–31, 1928, published in the Transactions of the A. I. E. E., or described by D. D. Knowles in The Electric Journal of April, 1928. This device is merely illustrative of a suitable condenser-operated circuit maker and breaker.

The tube is designated diagrammatically at 30 and has an anode 31 and grid 32 connected respectively to ground and to the arm 18 which is capable of conducting current to the set of condenser plates 26. In the conductor 33 joining the grid to the arm 18 is inserted an adjustable resistor 34 rated in megohms. The arm 20, which is conductive to the plates 25, is also grounded.

The anode is at one side of the grid, and at the other side of the grid is a cathode 35. An induced current is supplied to the anode and cathode from a transformer having a primary winding 36 and a secondary winding 37. One end of the secondary winding is joined by a conductor 38 to the anode 31, while the other end of the secondary winding is connected to the cathode 35 by a conductor 39 containing the winding 40 of a relay and optionally resistance 41 in series.

The tube is filled with neon gas and is of such a nature that current does not ordinarily flow between the anode 31 and cathode 35, but the difference of potential produces a high negative charge on the grid 32 which will block the tube if the charge is not allowed to leak off. The variable condenser constituted by the plates 25 and 26 may be made to discharge the grid on attaining its maximum capacity, whereupon the tube breaks down, or in other words permits ionization of the neon gas, and closes the circuit between the points 31 and 35. The particular point on the scale 16 at which the condenser will have its maximum capacity is obviously determined by the setting of the arm 20. A variable de-sensitizing condenser 42 is connected between the grid and the anode for affecting the grid in such a manner that it will leak off when the plates 25 and 26 attain their maximum capacity. The variable condenser 25, 26 co-operates with the variable condenser 42, in affecting the grid, in the manner of a vernier or micro-condenser. The adjustable resistor 34 reduces the electrostatic field produced in the condenser 25, 26 by the condenser 42.

In the coil 40 is a core 43 adapted to attract a switch arm 44 to close another circuit 45 supplied with current at terminals 46 and also containing a relay coil 47 of greater magnitude than the coil 40. The coil 47 operates a main switch 48 in the main circuit 49 which contains the element 2 and receives current at terminals 50.

The application of the invention to a heating system is merely illustrative, for the invention is also applicable to systems in which conditions other than a temperature condition are to be controlled. The essence of the invention consists in providing cooperating condenser plates on the relatively movable elements of the indicator of the condition to be controlled, and utilizing the capacity of the condenser as a means of controlling the supply of energy for creating the condition to be controlled.

Although a specific embodiment of the invention has been illustrated and described, it will be understood that various alterations in the details of construction may be made without departing from the scope of the invention, as indicated by the appended claims.

What I claim is:—

1. A control apparatus comprising a movable element adapted to respond to changes in the condition to be indicated, a fixed element, cooperating condenser plates carried by said elements and adapted to assume a condenser relation to each other, a radio-active condenser-controlled circuit maker and breaker electrically connected to said elements, means for producing conditions affecting said movable element, and means in circuit with said circuit maker and breaker for governing the first named means.

2. A control apparatus comprising a movable element adapted to respond to changes in the condition to be indicated, a fixed element, cooperating condenser plates carried by said elements and adapted to assume a condenser relation to each other, a grid glow tube having an anode and a grid electrically connected respectively to said elements, means for producing conditions affecting said movable element, and means in circuit with the cathode of said tube for governing the first named means.

3. In a controlled heating system, heating means, a thermo-couple exposed to said means, a moving coil type indicator having a field and a winding, said winding being connected to the terminals of said couple, a movable element and a fixed element comprised in said indicator, said movable element being responsive to current changes in said winding, cooperating condenser plates carried by said elements and adapted to assume a condenser relation to each other, and a condenser-controlled circuit maker and breaker electrically connected to one of said elements and operable on said heating means.

4. In a controlled heating system, heating means, a thermo-couple exposed to said means, a moving coil type indicator having a field and a winding, said winding being connected to the terminals of said couple, a movable element and a fixed element comprised in said indicator, said movable element being responsive to current changes in said winding, cooperating condenser plates carried by said elements and adapted to assume a condenser relation to each other, a grid glow tube having an anode and a grid electrically connected respectively to said elements, and means in circuit with the cathode of said tube for governing the supply of energy to said heating means.

5. In a controlled heating system, heating means, a thermo-couple exposed to said means, a moving coil type indicator having a field and a winding, said winding being connected to the terminals of said couple, a movable element and a fixed element comprised in said indicator, said movable element being responsive to current changes in said winding, cooperating condenser plates carried by said elements and adapted to assume a condenser relation to each other, a grid glow tube having an anode and a grid electrically connected respectively to said elements, and a relay system operatively connected to the cathode of said tube and operable on said heating means.

6. In a control system, means for producing a given condition in said system, a member exposed to said means and adapted to generate an electrical current varying with said condition, a moving coil type indicator having a field and a winding, said winding being connected to said member, a movable element and a fixed element comprised in said indicator, said movable element being responsive to current changes in said winding, co-operating condenser plates carried by said elements and adapted to assume a condenser relation to each other, and a condenser controlled circuit maker and breaker electrically connected to one of said elements and operable on said means.

In testimony whereof I affix my signature.
JOHN D. LOWRY.